Feb. 2, 1965   R. R. DILLON   3,167,953
MECHANICAL FORCE GAUGE
Filed July 5, 1962

INVENTOR.
RALPH R. DILLON
BY Elliott & Pastoriza
ATTORNEYS ns
3,167,953
MECHANICAL FORCE GAUGE
Ralph R. Dillon, Van Nuys, Calif., assignor to W. C. Dillon & Company, Inc., a corporation of California
Filed July 5, 1962, Ser. No. 207,644
7 Claims. (Cl. 73—141)

This invention relates generally to force measuring instruments and more particularly to an improved mechanical type force gauge particularly useful for measuring opposing forces such as provided between electrodes of a welding machine.

It is common practice to check periodically the force exerted between opposing electrodes in a welding machine. For this purpose, there have been provided heretofore a number of different types of force gauges, some mechanical and some electrical. Such force gauges must be designed with certain considerations in mind. For example, since the opposing electrodes of most welding machines are spaced relatively closely together, it is important that any force gauge designed to measure electrode pressures have its force engaging surfaces relatively close together so that the instrument may be easily fitted between the electrodes.

Another important consideration in the design of such an instrument is to provide for easy manual manipulation thereof and easy reading of the actual forces to be measured. With this latter end in view, mechanical type gauges are often preferable to electrical gauges which may require electrical leads and auxiliary electrical equipment such as amplifiers and the like.

It is also desirable to provide a simple means for varying both the sensitivity and capacity of the force gauge. With such adjustments, the versatility of the instrument is greatly increased.

With all of the above in mind, it is accordingly a primary object of this invention to provide a greatly improved mechanical type force gauge particularly adapted for measuring opposing forces as exist between the electrodes of a welding machine.

More particularly, it is an object to provide an improved mechanical force gauge which is extremely simple in design, employing a minimum number of parts so that ruggedness and maintenance-free operation are assured.

Still another object is to provide an improved force gauge in which both the sensitivity and capacity may be very easily changed to suit a variety of different uses and yet in which the precision and accuracy of force measurements are maintained.

Briefly, these and many other objects and advantages of this invention are attained by providing first and second members extending in spaced parallel relationship and integrally connected together at one end with their other ends free. Force engaging surfaces are disposed adjacent to their connected ends so that opposing forces exerted thereon cause at least one of the free ends to move relative to the other. A suitable indicating means in turn is responsive to relative movement of the free ends of the members to provide a reading of the force causing the movement.

A unique mounting frame for the indicator is provided so that relative movement of the indicator along one of the legs is possible to thereby enable the sensitivity of the indicator to be changed. In addition, the connected ends of the first and second members are in the form of a loop shape adapted to receive different types of resilient sleeves to the end that the spring constant of the legs of the hairpin shape may be varied, thereby varying the capacity of the gauge.

The force engaging surfaces of the instrument itself are spaced relatively closely together so that the same may be readily received between the opposing electrodes of a welding machine to measure the force. The indicating means includes a large dial gauge which is easy to read so that precise and accurate measurements may be readily taken. Since the entire structure is mechanical, there are no electrical leads or auxiliary electrical equipment required.

A better understanding of the invention will be had by now referring to a preferred embodiment thereof as illustrated in the accompanying drawings, in which.

Figure 1:
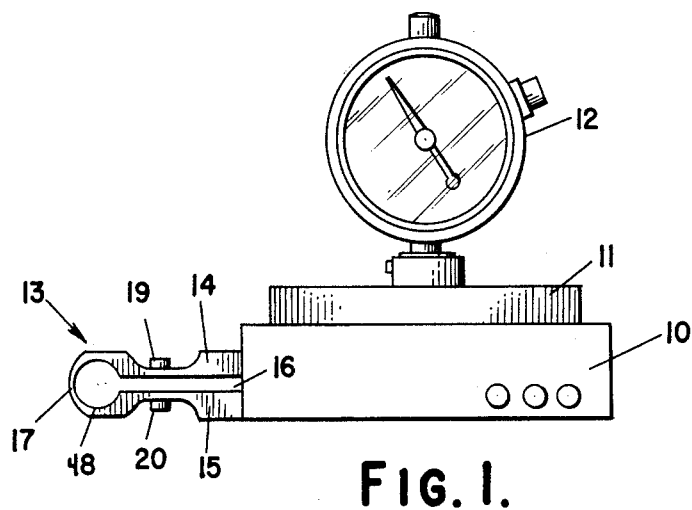
FIGURE 1 is a side elevational view of the improved mechanical force gauge of this invention.

Referring first to FIGURE 1, the force gauge includes a supporting frame 10 preferably in the shape of a channel. A suitable mounting means 11 is positioned on the base portion of the channel 10 for supporting an indicator such as the gauge 12.

The force responsive element itself is shown at 13 and is generally hairpin shaped including first and second legs 14 and 15 extending in parallel spaced relationship partially into the channel body 10 to define a central slot 16. The exposed ends of these legs are connected together by a loop structure 17 defining a relatively large opening 18. Suitable opposing force engaging surfaces 19 and 20 in turn are located adjacent to the connected ends of the first and second members 14 and 15.

Figure 2:
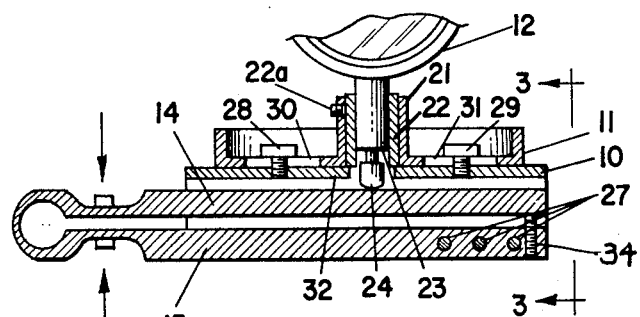
FIGURE 2 is a fragmentary cross-sectional view of the instrument shown in FIGURE 1.

Referring now to FIGURE 2, the mounting means 11 includes a cylindrically upwardly projecting housing 21 for receiving the lower stem portion of the gauge 12. A split sleeve 22 in turn is mounted within the housing 21 to engage and retain arm 23 of the gauge 12 as by the radially inwardly directed force of "Allen" screw 22a. A probe 24, biased downwardly from arm 23, engages the first member 14 at a given point spaced from the connected end thereof.

Figure 3:
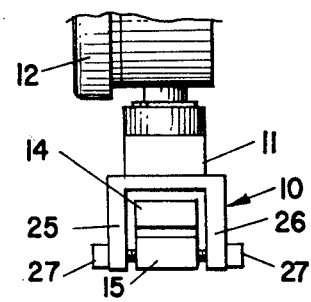
FIGURE 3 is an end elevational fragmentary view taken in the direction of the arrows 3—3 of FIGURE 2; and, FIGURE 4 is an enlarged exploded perspective view of a portion of the force element part of the gauge useful in explaining an important feature of the invention.

With particular reference to FIGURE 3, it will be noted that both the sides 25 and 26 of the channel 10 are rigidly secured to the second member 15 so that the first member 14 is disposed between the second member and the base portion of the channel 10.

Referring again to the mounting means 11 of FIGURE 2, there are provided set screws 28 and 29 passing through elongated slots 30 and 31 in the mounting 11 and threaded into the base of the channel 10. With this arrangement, the entire mounting means 11 may be slid back and forth along the base to vary the distance of the sensitive probe 24 from the connected ends of the members 14 and 15. To accommodate this movement, there is provided an elongated opening 32 in the base of channel 10. Changing the position of the mounting 11 will vary the sensitivity of the force gauge.

Figure 4:
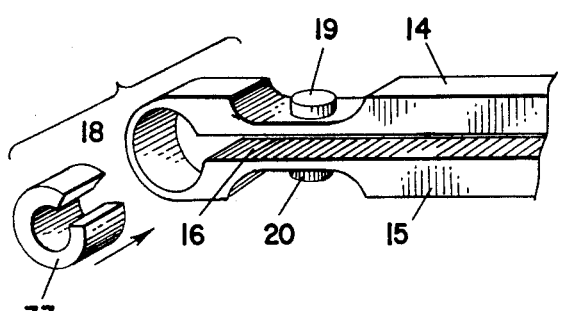

In FIGURE 4, there is illustrated a split sleeve structure 33 dimensioned to be received within the loop portion 18 of the hairpin element 13. The sleeve 33 has a specified spring constant with respect to resilient circumferential contraction. Thus, when the same is inserted in the opening 18 with its split or opposing edges registering with the opening for slot 16, the overall stiffness or spring constant of the legs 14 and 15 is varied. The capacity of the forced gauge may thus be varied by inserting different sleeves 33, depending upon the magnitude of forces to be measured.

The operation of the improved mechanical force gauge of this invention will be evident from the foregoing description. Initially, the mounting means 11 for the gauge 12 is longitudinally adjusted so that the probe 24 will engage the first member 14 at a point depending upon the contemplated range of forces through which the instrument is to operate. Thus, if the forces are not great and a high degree of sensitivity is desired, it is preferable to position the mounting means to its extreme rightward position to position the probe 24 farthest from the connected ends of the legs. By this arrangement, there will be the maximum movement of one of the legs for a given force on the force engaging surfaces 19 and 20; that is, the mechanical motion multiplication will be greatest. On the other hand, if the range of the scale on the gauge 12 is limited so that it can only accommodate a given degree of movement for given forces applied, it is preferable to position the mounting means 11 farthest to the left so that probe 24 is closest to the connected ends. The movement of the mounting means 11 thus enables proper calibration of the forces with respect to the scale reading.

To change the capacity or ability of the instrument to measure forces which differ greatly in magnitude, the split sleeve adapter 33 as described in conjunction with FIGURE 4 may be used. If relatively small forces are to be measured, the greatest degree of movement for a given force will be effected in the absence of the sleeve wherein the only resilient forces acting on the legs is that due to the loop structure 17. On the other hand, if relatively large forces are to be measured and it is desired to stiffen the leg members so that such large forces may be accommodated by the structure, the sleeve 33 having a stiffer spring constant against a circumferential contraction would be inserted in the opening 18.

If desired, the interior biasing force acting on probe 24 may be of sufficient strength to urge the probe 24 against the first member 14 with a given force to preload the hairpin shaped element. The scale may then be zero set. By such pre-loading, hysteresis effects in the hairpin element 13 are minimized.

Also, as shown in FIGURE 2, an adjustable overload screw 34 may be provided to limit movement of member 14 relative to member 15.

From the foregoing description, it will thus be seen that both the sensitivity and capacity of the force gauge may very easily be varied. Furthermore, it will be evident that the structure as described is extremely rugged and simple insofar as the number of movable parts are concerned. By employing only a single integral hairpin shaped element as the basic measuring member, great precision and accuracy is assured. The gauge 12 itself is relatively large compared to the remaining portion of the instrument and thus provides for easy reading. Finally, the opposing force engaging surfaces 19 and 20 are relatively close together so that they may readily be inserted between closely spaced electrodes of a welding machine.

While the one particular embodiment has been shown and described in conjunction with measuring the forces between opposing electrodes of welding machines, it should be understood that the present invention will have other uses. The instrument is therefore not to be thought of as limited to the one application set forth merely for illustrative purposes.

What is claimed is:

1. A force gauge comprising: a resilient element having connected ends and free ends to define a hairpin shape and including force engaging surfaces adjacent to its connected ends so that opposing forces exerted thereon cause at least one of its free ends to move relative to the other; a supporting channel housing said free ends, said channel being secured to one of said free ends and indicator means supported from said channel and responsive to relative movement of the other of said free ends to measure said opposing forces.

2. A force gauge comprising, in combination: first and second members extending in substantially parallel spaced relationship and integrally connected together at one end with their other ends free, thereby defining a general hairpin shape, said members respectively including force engaging surfaces adjacent to their connected ends so that forces exerted thereon cause relative movement of its free end portions; a supporting channel housing said free ends and coupled to one of said first and second members and indicator means supported from said channel and coupled to the other of said members for measuring said relative movement.

3. A force gauge according to claim 2, including means receivable between the connected ends of said member and said force engaging surfaces for varying the spring constant of said free ends whereby the capacity of said force gauge may be changed.

4. A force gauge comprising, in combination: a supporting channel; first and second members extending in parallel spaced relationship, said members being integrally connected together at one end exterior of one end of said channel with their free end portions extending into said channel to define a resilient hairpin shaped element; means rigidly securing the free end portion of said second member to the sides of said channel so that the free end portion of said first member is disposed between said free end portion of said second member and the base of said channel; force engaging surfaces on said first and second members exterior of said channel adjacent to their connected ends; an indicator; and mounting means securing said indicator to said channel, the base of said channel including an opening and said indicator having a sensitive probe extending normally through said opening to engage said first member whereby opposing forces exerted on said engaging surfaces resiliently moves said first member relative to said second member and channel to operate said indicator.

5. A force gauge according to claim 4, in which said mounting menas is slidable along the exterior base of said channel and includes locking means for securing said mounting means in any one set position whereby the distance of said probe from the connected ends of said first and second members is adjustable to vary the sensitivity of said indicator.

6. A force gauge according to claim 5, in which the connected end of said members is formed into a loop to provide a given resiliency between the free end portions of said members; and means receivable within said loop to vary the spring constant exhibited by said free end portions when urged together whereby the capacity of said force gauge may be varied.

7. A force gauge according to claim 6, in which said means comprises a split sleeve having a given resiliency when circumferentially contracted.

References Cited in the file of this patent
UNITED STATES PATENTS

| | | |
|---|---|---|
| 2,672,755 | Hohner | Mar. 23, 1954 |
| 3,090,227 | Glerum | May 21, 1963 |

FOREIGN PATENTS

| | | |
|---|---|---|
| 614,319 | Germany | June 6, 1935 |